United States Patent
Eller et al.

(10) Patent No.: US 6,782,334 B1
(45) Date of Patent: Aug. 24, 2004

(54) METHOD AND SYSTEM FOR CALIBRATION OF TIME DELAY INTEGRATION IMAGING DEVICES

(75) Inventors: Peggi J. Eller, Endicott, NY (US); Robert M. Krohn, Ithaca, NY (US); Douglas N. McMartin, Apalachin, NY (US); Steven J. Pratt, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/404,690

(22) Filed: Apr. 1, 2003

(51) Int. Cl.[7] .......................... G01D 18/00; H04N 1/04
(52) U.S. Cl. .................. 702/104; 702/85; 702/150; 702/153; 358/474; 250/557
(58) Field of Search .................. 358/486, 493, 358/473, 474, 488, 540; 250/559.26, 557, 208.1, 203.01; 702/155, 85, 95, 104, 100, 153; 382/312, 313; 356/612, 614

(56) References Cited

U.S. PATENT DOCUMENTS

| | | | |
|---|---|---|---|
| 4,280,141 A | 7/1981 | McCann et al. | 358/213 |
| 5,416,609 A * | 5/1995 | Matsuda et al. | 358/474 |
| 5,452,109 A | 9/1995 | Compton | 358/482 |
| 5,757,425 A * | 5/1998 | Barton et al. | 348/241 |
| 5,812,190 A | 9/1998 | Audier et al. | 348/295 |
| 5,825,670 A * | 10/1998 | Chernoff et al. | 702/85 |
| RE36,047 E | 1/1999 | Gilblom et al. | 348/91 |
| 6,005,617 A | 12/1999 | Shimamoto et al. | 348/295 |
| 6,024,018 A | 2/2000 | Darel et al. | 101/365 |
| 6,535,291 B1 * | 3/2003 | Skunes et al. | 356/614 |

* cited by examiner

*Primary Examiner*—Bryan Bui
(74) *Attorney, Agent, or Firm*—Perkins Smith & Cohen LLP; Jacob N. Erlich; Orlando Lopez

(57) ABSTRACT

Methods and systems for calibrating and aligning Time Delay Integration (TDI) Charge Coupled Device (CCD) sensors. A TDI sensor for linear imaging (line sensor) is calibrated by generating a two dimensional image from the line sensor, analyzing the two dimensional image, and calibrating the line sensor based on the analysis. An alignment correction can then be generated, the correction applied to the line sensor placement and the line sensor re-tested. A calibration system includes means for generating a two dimensional image from the TDI line sensor, means for analyzing the two dimensional image, and means for calibrating the line sensor based on the analysis of the two dimensional image.

9 Claims, 9 Drawing Sheets

N x M Area scan representation of TDI output

Graph of Line scan representation of TDI output

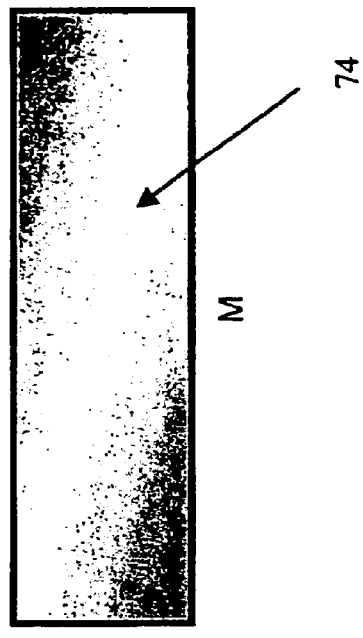
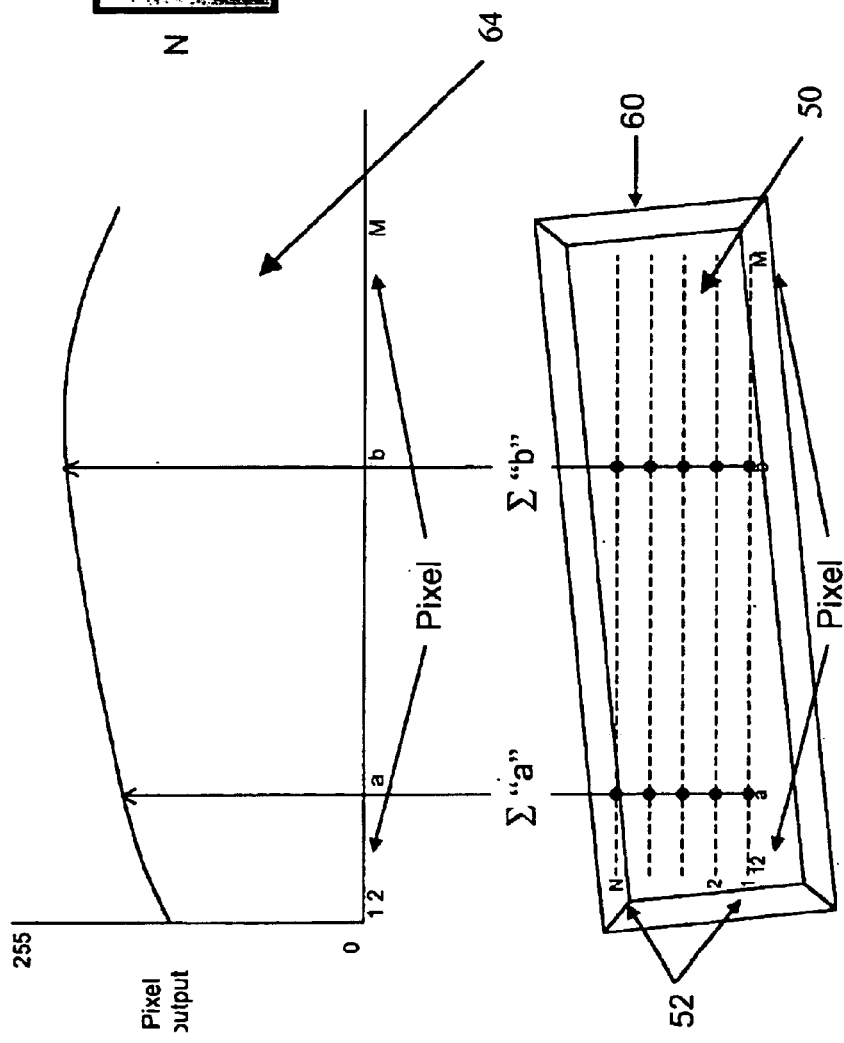
Fig. 4b
Fig. 4a

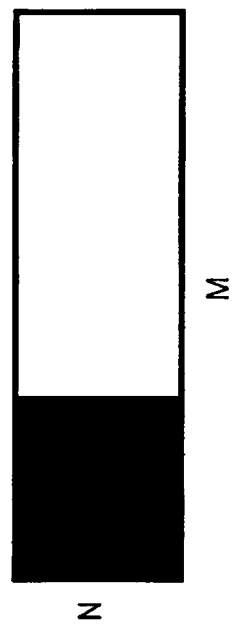
Graph of Line scan representation of TDI output
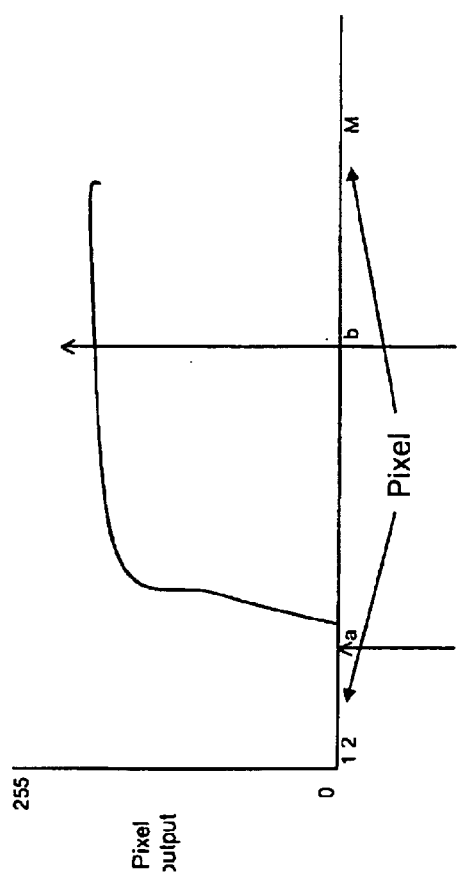
N x M Area scan representation of TDI output
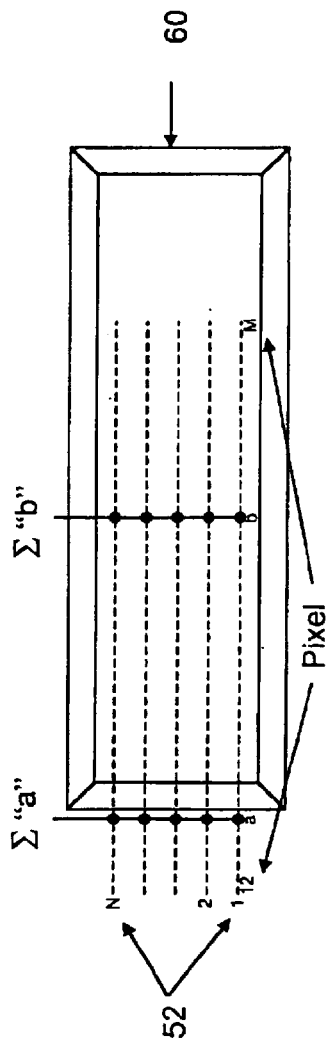
Fig. 6b
Fig. 6a

METHOD AND SYSTEM FOR CALIBRATION OF TIME DELAY INTEGRATION IMAGING DEVICES

BACKGROUND OF THE INVENTION

This invention relates generally to calibration and alignment methods and system, and, more particularly to methods and system for calibration and alignment of imaging devices operating in time delay integration (TDI) mode.

CCDs (charge coupled devices) are utilized as imaging sensors. A two dimensional CCD sensor includes a two dimensional array of photodiode areas and structures (CCD registers) to transport the charge from each photodiode across the array and to "read" the charge at one location. The basic charge coupled structure consists of a metal-insulation-semiconductor (MIS) capacitor structure in which minority carriers are stored in a "spatially defined depletion region," also called "potential well" at the surface of the semiconductor material. A CCD includes arrays of the metal-insulation-semiconductor (MIS) capacitors. The charge (charge packet) is moved along the surface by moving the potential minimum. The movement is accomplished by applying a proper sequence of clock voltage pulses.

Two dimensional (area) CCD sensors can be utilized as time delay integration (TDI) sensors for linear imaging. Time delay integration (TDI) is an integration and readout mode that allows the acquisition of a line image from a moving image. In this mode of operation, a linear image is scanned across one of the sensor directions (from top to bottom, for example). The CCD registers along the direction of motion are clocked to ensure that charge packets are transferred at the rate that the image is moving at and in the same direction as the image motion. This results in the summation of the charge from the sensing areas (pixels) along the direction of motion. Sensitivity is increased at the expense of resolution.

However, line scan imaging systems that employ Time Delay Integration (TDI) Charge Coupled Device (CCD) sensors are difficult to align and calibrate for optimal image quality. The difficulty arises due to the two-dimensional characteristic of TDI CCD arrays.

There is a need for methods and systems for calibrating and aligning Time Delay Integration (TDI) Charge Coupled Device (CCD) sensors.

BRIEF SUMMARY OF THE INVENTION

The present invention provides methods and systems for calibrating and aligning Time Delay Integration (TDI) Charge Coupled Device (CCD) sensors.

Applying an embodiment of the method of this invention, a TDI sensor for linear imaging (line sensor) is calibrated by generating a two dimensional image from the line sensor, analyzing the two dimensional image, and calibrating the line sensor based on the analysis. An alignment correction can then be generated, the correction applied to the line sensor placement and the line sensor re-tested.

A calibration system of this invention includes means for generating a two dimensional image from the TDI line sensor, means for analyzing the two dimensional image, and means for calibrating the line sensor based on the analysis of the two dimensional image. Since the TDI line sensor is an area sensor, the two dimensional image results from obtaining the signal from each pixel. In one embodiment, the TDI array clocking arrangement is modified to obtain the signal from each pixel. Analysis methods for the two dimensional image include, but are not limited to, visual analysis of the image and image acquisition and processing.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWING

FIG. 3b is a graphical schematic representation of the area image for the configuration of FIG. 3a;

FIG. 4a is a graphical schematic representation of another TDI line sensor alignment and conventional output;

FIG. 4b is a graphical schematic representation of the area image for the configuration of FIG. 4a;

FIG. 5b is a graphical schematic representation of the area image for the configuration of FIG. 5a;

FIG. 6a is a graphical schematic representation of still another TDI line sensor alignment and conventional output;

FIG. 6b is a graphical schematic representation of the area image for the configuration of FIG. 6a;

DETAILED DESCRIPTION OF THE INVENTION

Methods and systems for calibrating and aligning Time Delay Integration (TDI) Charge Coupled Device (CCD) sensors are disclosed hereinbelow.

Figure 1:
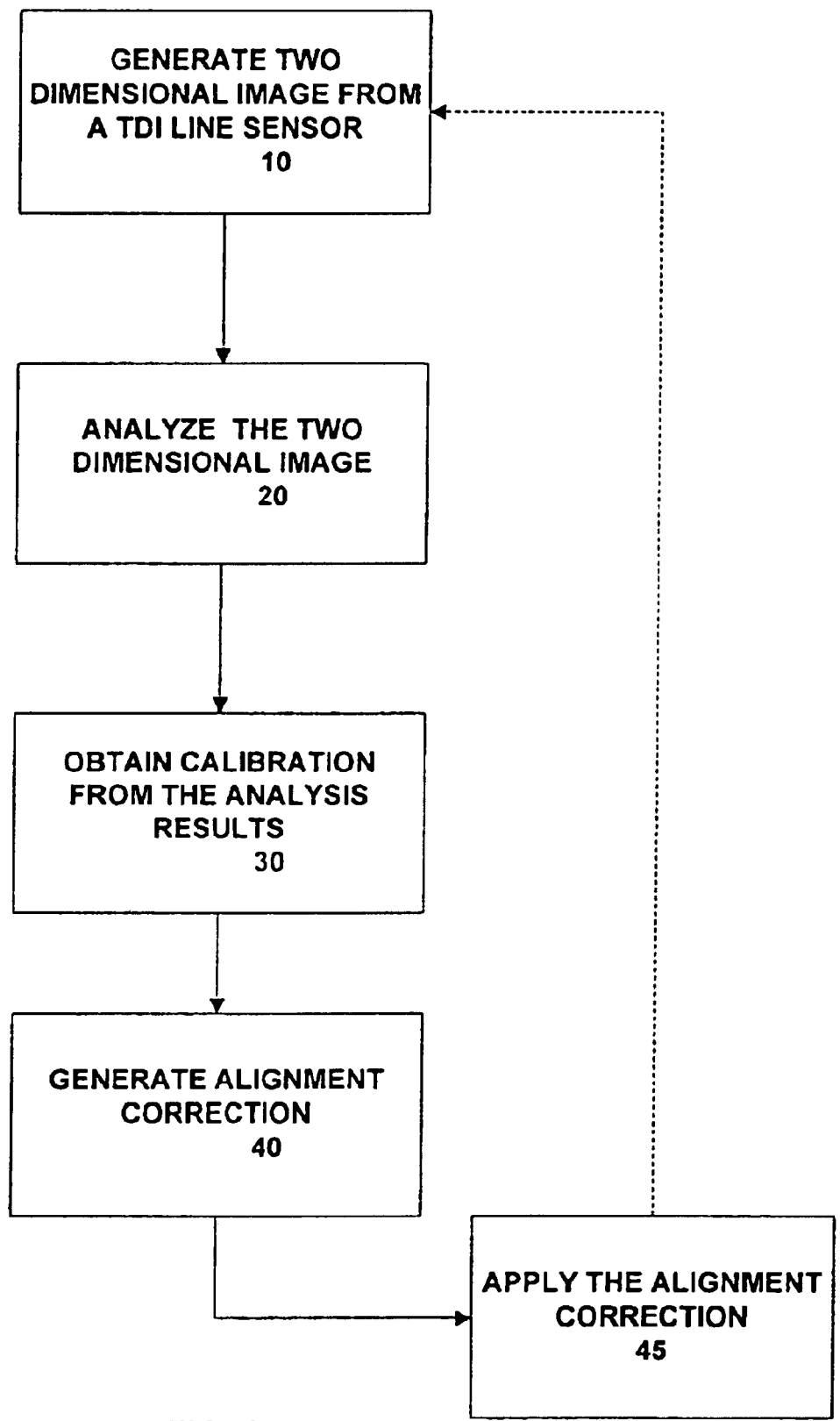
FIG. 1 depicts a flowchart of an embodiment of the method of this invention.

A flowchart of an embodiment of the method of this invention is shown in FIG. 1. Referring to FIG. 1, a two dimensional image is generated (step 10, FIG. 1) from a Time Delay Integration (TDI) Charge Coupled Device (CCD) line sensor for calibrating the Time Delay Integration (TDI) Charge Coupled Device (CCD) line sensor. The two dimensional image is then analyzed (step 20, FIG. 1) and the line sensor is calibrated based on the analysis (step 30, FIG. 1). An alignment correction can be generated (step 40, FIG. 1) from the calibration. After an alignment correction is generated, the alignment correction may be applied to the sensor placement (step 45, FIG. 1) and the sensor re-calibrated by repeating steps 10 trough 30 of FIG. 1.

Figure 2:
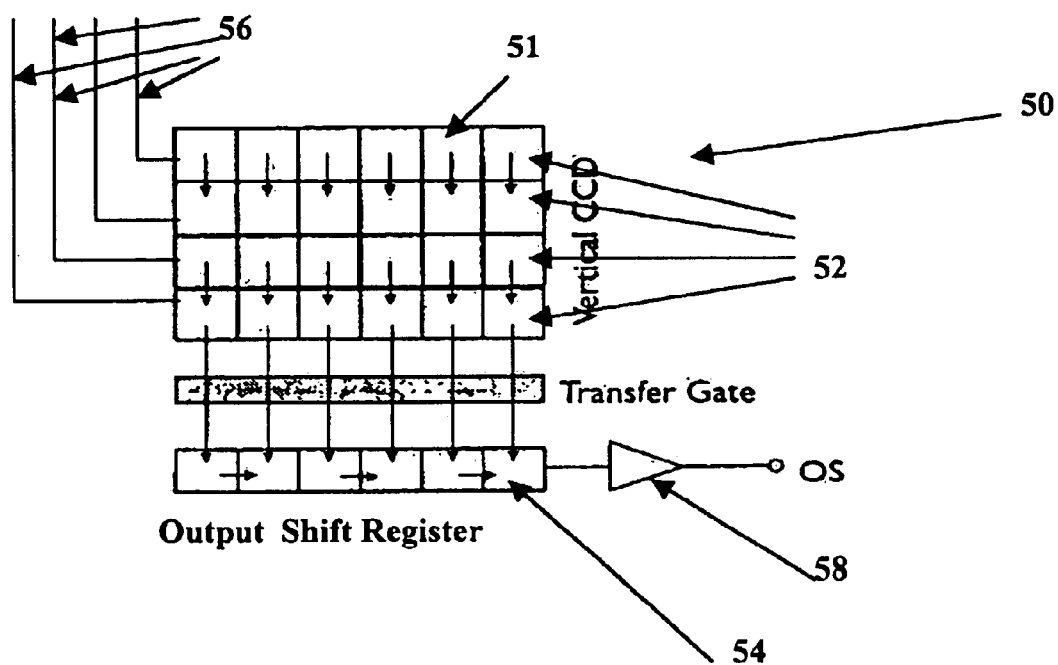
FIG. 2 is a schematic graphical representation of a conventional TDI line sensor.

A conventional TDI line sensor is shown in FIG. 2. Referring to FIG. 2, the CCD sensor 50 includes row CCD registers 52, clocking voltage signal lines 56, and an output register 54. If operated as an area array, as each row 52 is shifted down, the charge that was stored in each capacitor in the row is transferred to the output register 54. The charge in the output register 54 is transferred out to an output amplifier 58 at a much higher speed so that the output register 54 is ready to accept the next row 52.

When operated as Time Delay Integration (TDI) line sensor, the sensor is placed so that the direction of motion of the image is the same as the direction of transfer (shifting) of charge from the row registers 52. The registers are clocked in a manner that ensures that the charge transfer rate is the same as (is synchronous with) the image scan rate. The synchronism between the image scan rate and the charge transfer rate results in the sensor in all of the rows of row registers 52 sensing the same image. As the charge in a row is transferred to the to the output register 54, the charge is accumulated and the output register 54 is transferred out to the output amplifier 58 after the all the rows used in TDI mode have been transferred to output register 54.

In one embodiment, a two dimensional image is generated from a sensor 50 operated as Time Delay Integration (TDI) line sensor by altering the speed at which the output register 54 is transferred out to the output amplifier 58. In another embodiment, both the speed at which the output register 54 is transferred out to the output amplifier 58 and the rate of charge transfer from the row registers 52 are altered in order to generate a two dimensional image from a sensor 50 operated as Time Delay Integration (TDI) line sensor. Circuits, connections, and/or processor instructions that implement the above disclosed embodiments and/or equivalents constitute means for generating a two dimensional image from a sensor 50 operated as Time Delay Integration (TDI) line sensor.

Figure 3B:
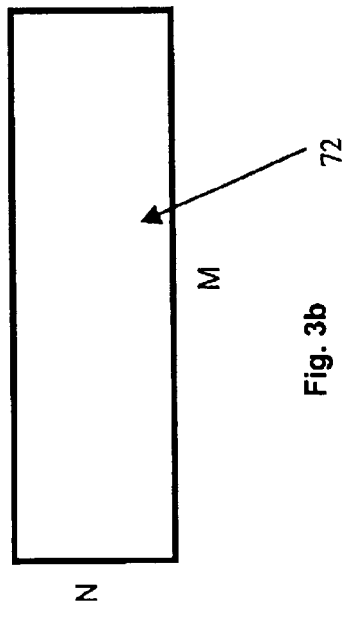
Figure 3A:
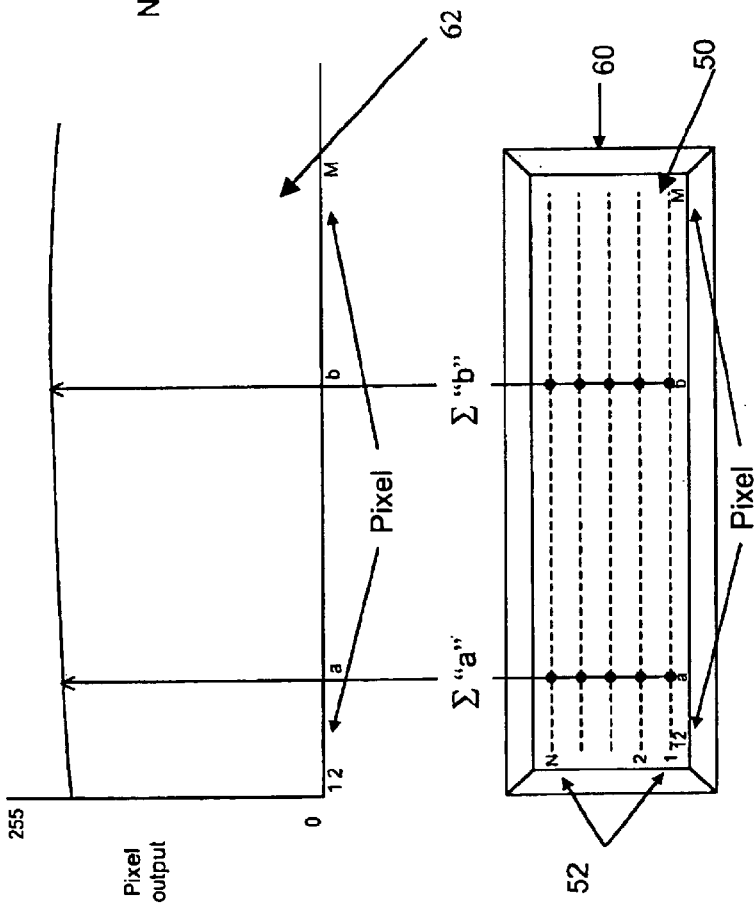
FIG. 3a is a graphical schematic representation of a TDI line sensor alignment and conventional output.

In order to even more clearly understand the method of the present invention, reference is now made to the following illustrative examples depicted in FIGS. 3a, 3b, 4a, 4b, 5a, 5b, 6a, and 6b. FIGS. 3a and 3b depict the results obtained from calibration testing of a sensor 50 correctly aligned within an aperture 60. (The frame 60 defines an aperture through which electromagnetic radiation impinges on the sensor 50. Hereinafter the aperture is referred to as aperture 60.) Light (electromagnetic radiation) reflected or scattered from an object being scanned arrives at sensor 50 through aperture 60. In FIGS. 3a, 3b, 4a, 4b, 5a, 5b, 6a, and 6b, the responses 62, 64, 66, 68 and images 72, 74, 76, 78 shown correspond to a "flat field" (constant intensity area) illumination. The light reflected or scattered from the object being scanned generates a response in each element 51 (FIG. 2) of the sensor 50. In the TDI mode of operation, the response of the elements 51 (FIG. 2) is summed over the rows 52 in order to obtain a line sensor response 62. The two dimensional image 72, corresponding to the configuration of FIG. 3a and generated by the sensor 50 in the area mode, is shown in FIG. 3b.

FIGS. 4a and 4b depict the results obtained from calibration testing of a sensor 50 when the sensor 50 is slanted with respect to the aperture 60. In the TDI mode of operation, the line sensor response 64 is obtained. The line sensor response 64 is not significantly different from the line sensor response 62 of the correctly aligned sensor of FIG. 3a. The two dimensional image 74, corresponding to the configuration of FIG. 4a and generated by the sensor 50 in the area mode, is shown in FIG. 4b. It should be noted that the response shown in FIG. 4b is significantly different from the response shown in FIG. 3b.

Figure 5B:
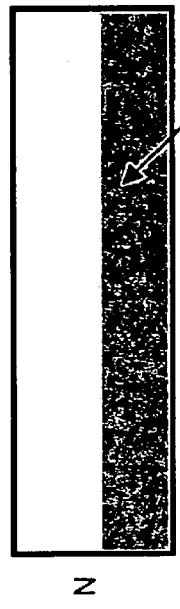
Figure 5B:
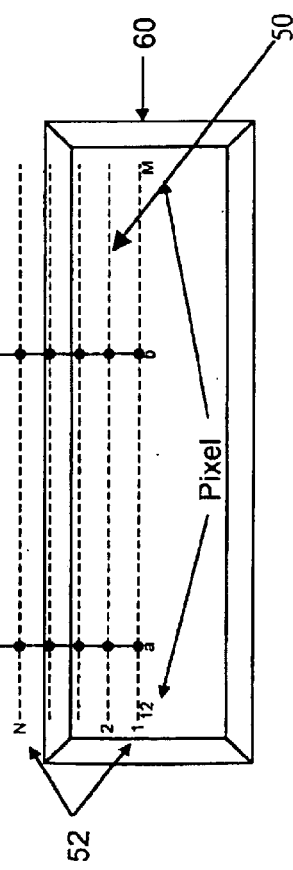
Figure 5A:
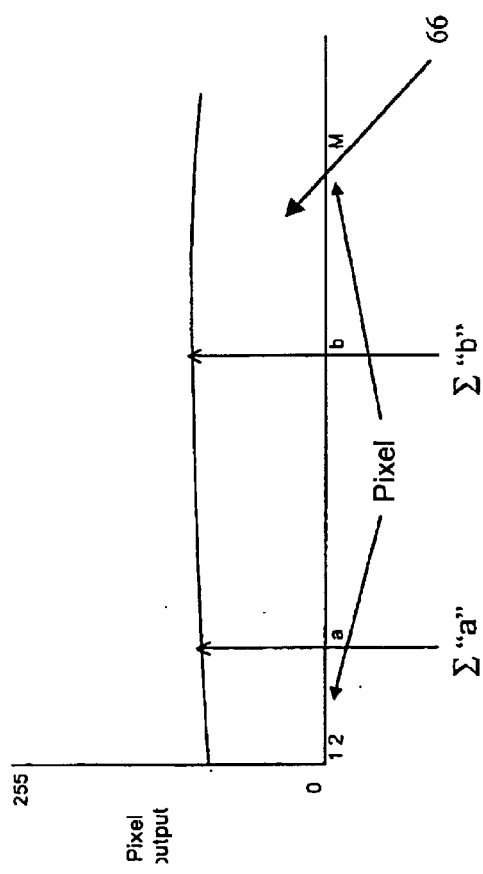
FIG. 5a is a graphical schematic representation of yet another TDI line sensor alignment and conventional output.

FIGS. 5a and 5b depict the results obtained from calibration testing of a sensor 50 when the sensor 50 is vertically displaced with respect to the aperture 60. In the TDI mode of operation, the line sensor response 66 is obtained. Since the amplitude of the line sensor response 66 is not known in absolute value but rather in relative units, the line sensor response 66 is not significantly different from the line sensor response 62 of the correctly aligned sensor of FIG. 3a. The two dimensional image 76, corresponding to the configuration of FIG. 5a and generated by the sensor 50 in the area mode, is shown in FIG. 5b. It should also be noted that the response shown in FIG. 5b is significantly different from the response shown in FIG. 3b.

FIGS. 6a and 6b depict the results obtained from calibration testing of a sensor 50 when the sensor 50 is horizontally displaced with respect to the aperture 60. In the TDI mode of operation, the line sensor response 68 is obtained. In this situation the line sensor response 68 has recognizable characteristics from the line sensor response 62 of the correctly aligned sensor of FIG. 3a. The two dimensional image 78, corresponding to the configuration of FIG. 6a and generated by the sensor 50 in the area mode, is shown in FIG. 6b. In this configuration, the response shown in FIG. 6b is also significantly different from the response shown in FIG. 3b.

Figure 7:
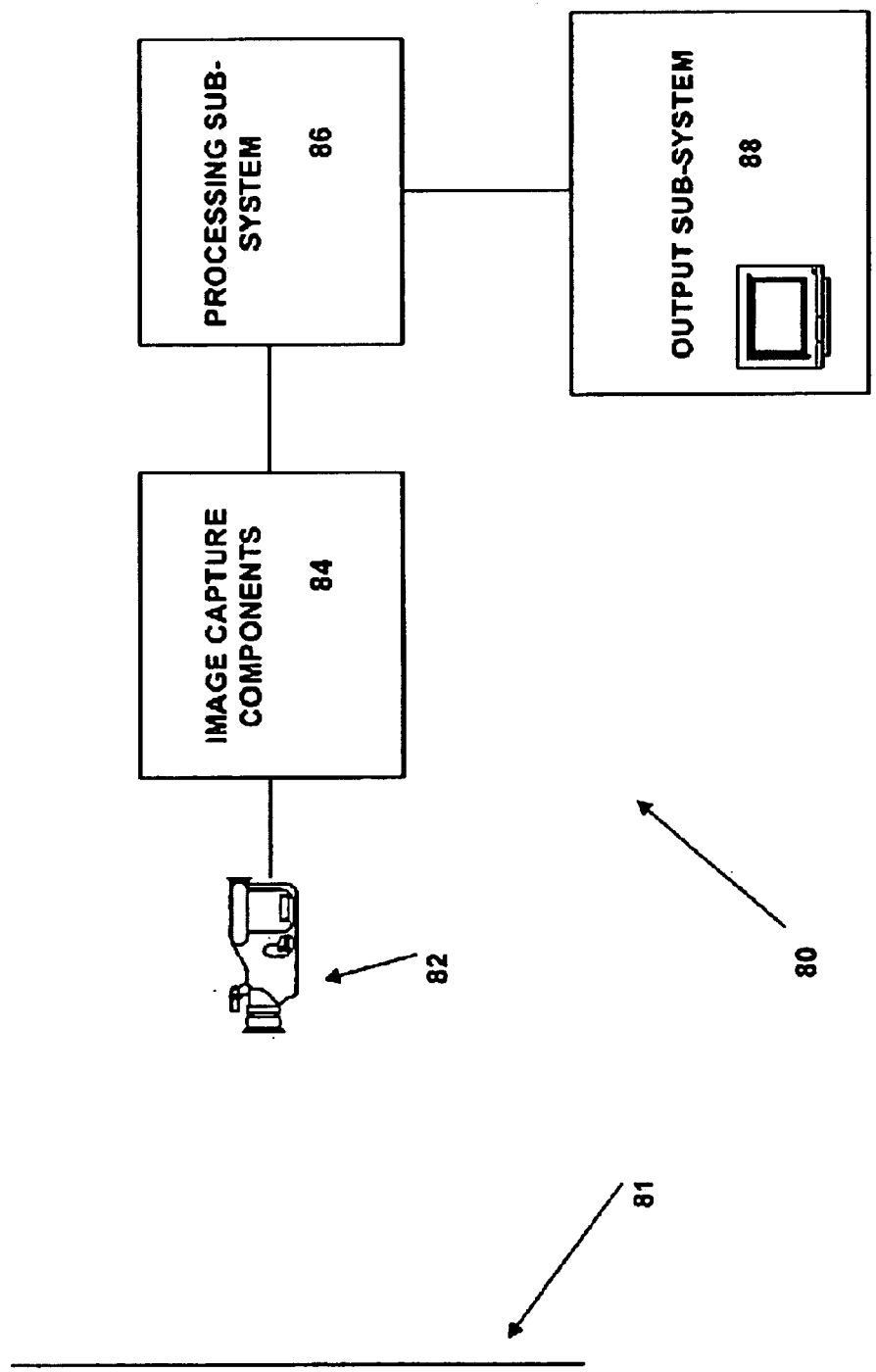
FIG. 7 is a graphical schematic and block diagram representation of an embodiment of a system of this invention.

The above examples illustrate the applicability of the method of this invention to situations encountered in the calibrating and aligning of Time Delay Integration (TDI) Charge Coupled Device (CCD) sensors. A block diagram representation of an embodiment of a system of this invention is shown in FIG. 7. Referring to FIG. 7, the sensor calibrating system 80 shown therein includes an image capture sub-system 82 having a line sensor, such as, but not limited to TDI sensor 50 of FIG. 2. The calibrating system 80 also includes an image generating sub-system 84 capable of generating a two dimensional image from the line sensor, a processing sub-system 86 capable of analyzing the two dimensional image and generating calibration information, and an output sub-system 88 capable of displaying results of the analysis. The target 81 utilized for obtaining the image may be a conventional target, such as a flat field" (constant intensity area) target, or a target of specific unique design (not shown). An illumination source (not shown) may also be utilized to illuminate the target.

The image capture sub-system 82, in one embodiment, may include optical components (not shown) capable of focusing an image onto the line sensor. The image capture sub-system 82 may be, but is not limited to, a camera or a test fixture including an aperture, such as aperture 60 in FIG. 3a, and a line sensor, such as sensor 50 in FIG. 3a.

The image generating sub-system 84 may include, but is not limited to, circuits, connections, and/or processor instructions that implement methods for generating two dimensional image data from a sensor, such as the sensor 50 of FIG.2, which is operated as Time Delay Integration (TDI) line sensor when the sensor is not under test. Referring again to FIG. 2, the methods implemented by the image generating sub-system 84 may include, but are not limited to, altering the speed at which the output register 54 is transferred out to the output amplifier 58 or altering both the speed at which the output register 54 is transferred out to the output amplifier 58 and the rate of charge transfer from the row registers 52.

The processing sub-system 86 may include, but is not limited to, dedicated circuits and/or sub-systems capable of providing instructions and data to a display device to display the two dimensional image. The processing sub-system 86 may also include, but is not limited to, dedicated circuits and/or sub-systems capable of obtaining a two dimensional gradient or a one-dimensional gradient in intensity for the two dimensional image. The processing sub-system 86 may include, but is not limited to, one or more processors (not shown), one or more memories (not shown) and interface circuits (also not shown) capable of interfacing the one or more processors and the one or more memories to the output sub-system 88.

The output sub-system 88 may include, but is not limited to, a display device and/or one or more output devices such as printers or output memories.

During operation of the sensor calibrating system 80, the image capture sub-system 82 captures an image from the target 81 utilizing a line sensor such as the sensor 50 of FIG. 2. The target 81 may be, but is not limited to, a conventional target, such as a "flat field" (constant intensity area) target, or a target of specific unique design (see, for example, the image 90 of a target in FIG. 9). The image capture sub-system 82 is utilized to generate two dimensional image data from the output of the sensor 50. The two dimensional image data is provided to the processing sub-system 86. The processing sub-system 86 analyzes the two dimensional image and generates calibration information. The analysis may include, but is not limited to, calculation of intensity gradients and/or generation of data for a display device. The processing sub-system 86 provides analysis results and/or data for a display device to the output sub-system 88. The calibration information may be, in one embodiment, generated by the processing sub-system 86 from the analysis results and, in another embodiment, be generated from observation of the displayed data. An alignment correction can be generated from the analysis results and/or from observation of the displayed data. (Hereinafter, when referring to the alignment correction, the term "analysis results" includes both results obtained directly from the processing sub-system 86 and results obtained from observation of the displayed data.) The alignment correction obtained from the analysis results may be implemented in the placement of the sensor in the image capture sub-system 82. The calibration operation may be repeated to verify calibration and alignment after the alignment correction is implemented.

Figure 8:
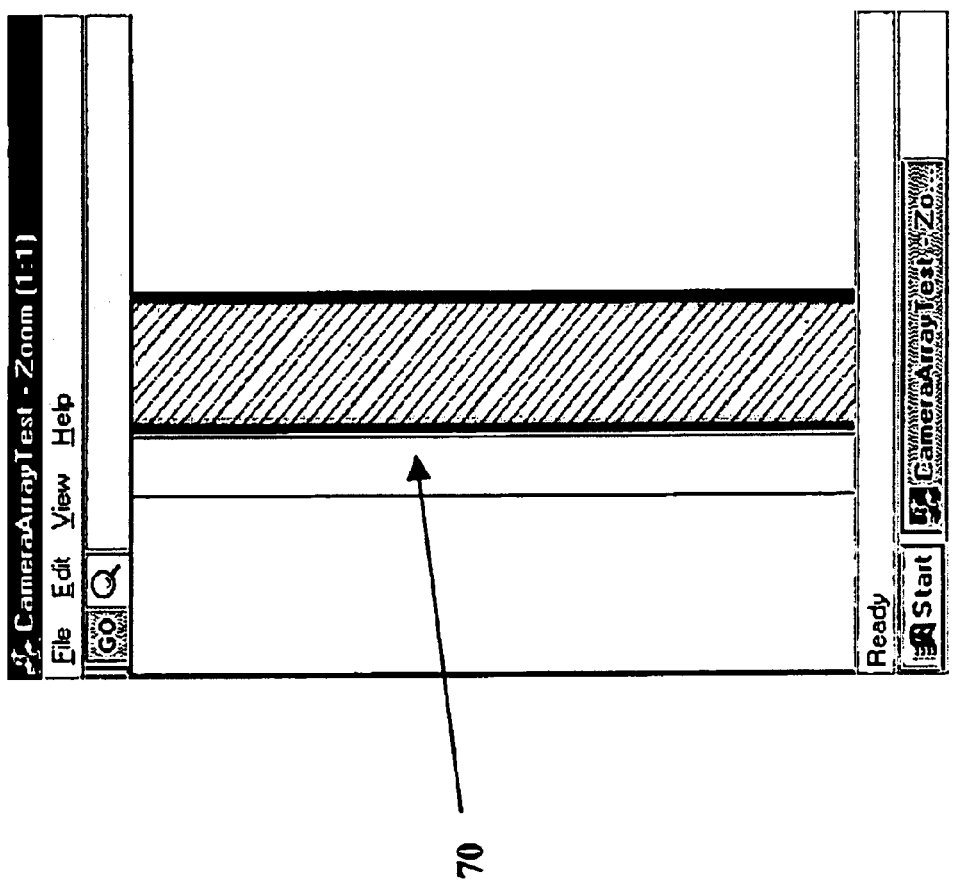
FIG. 8 is a graphical schematic representation of results from an embodiment of analysis of an area image; and, FIG. 9 represents another graphical schematic representation of results from an embodiment of analysis of an area image.
Figure 9:
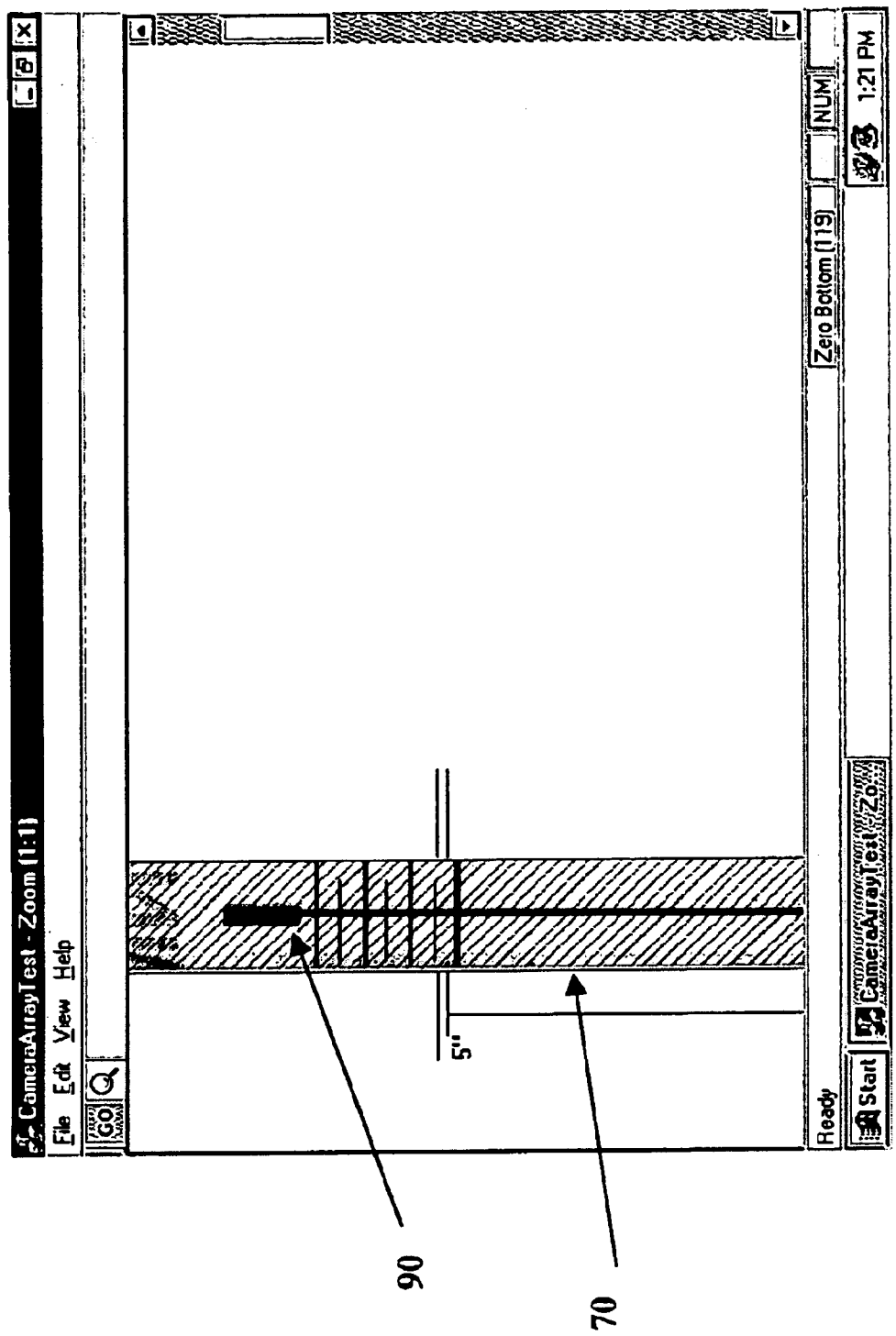

The results obtained from operation of an embodiment of the sensor calibrating system 80 of this invention in which the output sub-system 88 includes a display device and the processing sub-system 86 provides data for a display device are shown in FIGS. 8 and 9. The data, corresponding to a vertical section of a TDI line sensor, displayed by the display device when the target 81 is a "flat field" (constant intensity area) target is shown in FIG. 8. The data, corresponding to a vertical section of a TDI line sensor, displayed by the display device when the target 81 includes a target of specific unique design 90 shown in FIG. 9. The predetermined target 90 enables the establishing of a correspondence between distances in the target 90 to number of pixels in the sensor 50, thereby providing calibration information, and also provides alignment information.

Although the invention has been described with respect to various embodiments, it should be realized this invention is also capable of a wide variety of further and other embodiments within the spirit and scope of the appended claims.

What is claimed is:

1. A method of calibrating a line sensor comprising the steps of:
   a) generating a two dimensional image from the line sensor;
   b) analyzing said two dimensional image; and,
   c) generating calibration information for the line sensor based on the analysis in order to calibrate the line sensor.

2. The method of claim 1 wherein the step of analyzing said two dimensional image comprises the step of:
   analyzing a two dimensional gradient in intensity for the two dimensional image.

3. The method of claim 1 wherein the step of analyzing the two dimensional image comprises the step of:
   analyzing a one dimensional gradient in intensity for the two dimensional image.

4. The method of claim 1 wherein the stop of generating a two dimensional image comprises the step of generating a two dimensional image of a preselected target.

5. A method for aligning a line sensor comprising the steps of:
   a) generating a two dimensional image from the line sensor;
   b) analyzing said two dimensional image;
   c) generating calibration information for the line sensor based on the analysis in order to calibrate the line sensor;
   d) deriving an alignment correction from said analysis;
   e) applying the alignment correction in order to align the line sensor; and,
   f) repeating steps a), b), c) and d) to verify alignment.

6. A sensor calibration system comprising:
   an image capture sub-system including a line sensor;
   an image generating sub-system capable of generating two dimensional image data from said line sensor;
   a processing sub-system capable of analyzing the two dimensional image data and generating calibration information; and,
   an output sub-system capable of displaying results of said analysis;
   wherein the results of said analysis are used to calibrate the line sensor.

7. The system of claim 6 further comprising:
   a preselected target having a position that renders said preselected target capable of being detected by said line sensor.

8. The system of claim 7 wherein said image capture sub-system comprises at least one optical component capable of imaging a target onto the line sensor.

9. The system of claim 6 wherein said image capture sub-system comprises at least one optical component capable of imaging a target onto the line sensor.

* * * * *

UNITED STATES PATENT AND TRADEMARK OFFICE
CERTIFICATE OF CORRECTION

PATENT NO. : 6,782,334 B1
DATED : August 24, 2004
INVENTOR(S) : Peggi J. Eller et al.

It is certified that error appears in the above-identified patent and that said Letters Patent is hereby corrected as shown below:

Column 6,
Line 19, the portion of the line reading "wherein the stop" should read -- wherein the step --

Signed and Sealed this

Twenty-first Day of December, 2004

JON W. DUDAS
*Director of the United States Patent and Trademark Office*